Patented July 22, 1924.

1,502,642

UNITED STATES PATENT OFFICE.

RICHARD D. JORDAN AND JOHN H. HALL, OF HIGH BRIDGE, NEW JERSEY, ASSIGNORS TO TAYLOR-WHARTON IRON AND STEEL COMPANY, OF HIGH BRIDGE, NEW JERSEY, A CORPORATION OF NEW JERSEY.

METHOD OF MAKING MANGANESE STEEL.

No Drawing.   Application filed June 5, 1922.   Serial No. 566,141.

*To all whom it may concern:*

Be it known that we, RICHARD D. JORDAN and JOHN H. HALL, citizens of the United States, residing at High Bridge, in the county of Hunterdon and State of New Jersey, have invented certain new and useful Improvements in Methods of Making Manganese Steel, of which the following is a specification.

This invention relates to the production of commercial manganese steel in the electric furnace.

Heretofore and before our invention, the accepted practice has been to melt a charge of low phosphorous carbon scrap together with a small quantity of lime in the electric furnace under oxidizing conditions for the purpose and with the result of reducing the carbon in the metal while the scrap is melting. If there is too much carbon it is reduced to the proper proportions by the addition of iron ore or mill scale. After the carbon has been properly adjusted, the slag which is formed during the melting operation by a combination of the lime with the oxides of iron, silicon and manganese, is worked with a deoxidizing agent until the characteristic carbide slag is obtained. The proper ferro-manganese addition is then made, the heat brought to the proper temperature and then tapped. This method was desirably prolonged, it being the general opinion that the greater the time interval of treatment, the higher the quality of the steel.

We depart from this practice in several respects, as will hereinafter more fully appear, with the result that we obtain a superior product in a fractional part of the time heretofore required.

Broadly, our invention consists in making new manganese steel from carbon scrap essentially low in carbon and preferably from low carbon low phosphorous carbon steel scrap, or the same in conjunction with manganese steel scrap, the salient feature being the addition, at the outset and before melting, while exercising due precaution against the hazard of oxidation, of, in the one case, ferromanganese quantitatively sufficient to produce with the carbon scrap a finished manganese steel, and of, in the other case, sufficient ferromanganese to correct the deficiency in manganese of the manganese steel scrap.

In our method of making manganese steel in the electric furnace, we charge low carbon low phosphorous carbon steel scrap as distinguished from ordinary steel scrap, with the necessary amount of ferro-manganese to make a finished manganese steel, a small amount of a lime and silica sand mixture, and melt the charge under non-oxidizing conditions. The lime and sand, under the influence of heat, combine and rapidly form a slag that protects the metal from oxidation. After the bath is melted we bring the heat as rapidly as possible to the required temperature and tap from the furnace, working the slag with a deoxidizing agent from the time the scrap is melted until the heat is tapped. Any final adjustments of carbon, manganese and silicon that may be necessary are made just before the heat is tapped.

We have determined that manganese steel made in the electric furnace is of inferior quality when the silicon is below .35. We have discovered that a high quality steel results when the silicon is maintained above .35 and preferably above .50. If the silicon in the bath is below the desired limit, we increase it by the addition of ferro-silicon or, if the silicon and manganese are both low, we use low carbon silico-manganese, or a combination of the two, or a combination of silico-manganese and ferro-manganese.

We do not limit ourselves to a charge of low carbon scrap alone, as our method may be employed with equal facility with a mixture of carbon scrap and manganese scrap. In this case we will proceed exactly as before with the exception that a smaller amount of ferro-manganese will be added to the scrap.

Having described our invention, we claim:—

1. The method of making manganese steel in the electric furnace, which consists in establishing a charge including the necessary make-up of ferro-manganese and an agent capable under the influence of heat of establishing a substantially non-oxidizing environment, and rapidly melting the charge.

2. The method of making manganese steel in the electric furnace, which consists in establishing a charge including the necessary make-up of ferro-manganese and an agent capable under the influence of heat of establishing a substantially non-oxidizing environment, rapidly melting the charge, and after making such adjustments of carbon, manganese, and silicon as may be necessary or desirable, tapping the heat.

3. The method of making manganese steel under substantially non-oxidizing conditions, which consists in charging an electric furnace with scrap metal, ferro-manganese, and with an agent capable under the influence of heat of substantially eliminating the hazard of oxidation, rapidly melting the charge and controlling the melt so that the product will have a minimum silicon content of 0.50 per cent.

4. The method of making manganese steel in a non-oxidizing environment, which consists in melting low carbon low phosphorous carbon steel scrap together with the necessary amount of ferro-manganese in the presence of a rapidly forming slag capable of protecting the metal from oxidation, establishing the required temperature as rapidly as possible, and then tapping the heat following any adjustments that may be necessary.

5. The herein described quick method of making manganese steel from carbon scrap and ferro-manganese, or from carbon scrap, manganese scrap and ferro-manganese, which consists in charging such into an electric furnace and rapidly melting the charge in the presence of a lime and silica sand mixture, bringing the heat to the desired temperature as rapidly as possible, effecting any final adjustments of carbon, manganese and silicon, and then tapping.

6. The method of making manganese steel in the electric furnace, which consists in charging the furnace with low carbon low phosphorous carbon steel scrap and ferro-manganese and a slag producing material, and rapidly melting the charge.

7. The method of making manganese steel in the electric furnace, which consists in charging the furnace with low carbon low phosphorous carbon steel scrap, ferro-manganese, and a slag producing material, melting under substantially non-oxidizing conditions, effecting desirable corrections, and tapping.

8. The method of making manganese steel in the electric furnace, which consists in charging the furnace with low carbon low phosphorous carbon steel scrap, ferro-manganese, and a slag producing material, establishing the maximum current flow as rapidly as possible, and in a substantially non-oxidizing environment, and maintaining desirable control so that the product of the heat will have a silicon content of substantially .50 per cent.

9. The method of making manganese steel in the electric furnace, which consists in charging the furnace with scrap extremely low in carbon, adding ferromanganese quantitatively sufficient to make a finished manganese steel, and rapidly melting the scrap and ferromanganese while maintaining substantially non-oxidizing conditions.

10. The method of making manganese steel in the electric furnace, which consists in charging the furnace with scrap extremely low in carbon and with manganese steel scrap, and at the outset and before the application of melting heat adding to the charge ferromanganese quantitatively such that together with the manganese reclaimed from the scrap it will produce a finished manganese steel, and then melting the charge, including the ferromanganese, while maintaining substantially non-oxidizing conditions.

11. The method of making manganese steel in the electric furnace, which consists in charging the furnace with carbon steel scrap essentially low in carbon and with manganese steel scrap, and, at the outset and before the application of melting heat, adding to the charge ferromanganese quantitatively such that together with the manganese reclaimed from the scrap it will produce a finished manganese steel, melting the charge, including the ferromanganese, under substantially non-oxidizing conditions, and effecting final adjustment of the bath before tapping the heat.

12. The method of making manganese steel in the electric furnace, which consists in charging the furnace with low carbon low phosphorous carbon steel scrap and with manganese steel scrap, and, at the outset and before the step of melting, adding to the charge ferromanganese quantitatively such that together with the manganese reclaimed from the scrap it will produce a finished manganese steel, and then melting the charge, including the ferromanganese, while maintaining substantially non-oxidizing conditions.

13. The method of making manganese steel in the electric furnace, which consists in charging the furnace with low carbon low phosphorous carbon steel scrap and with manganese steel scrap, and, at the outset and before the step of melting, adding to the charge ferromanganese quantitatively such that together with the manganese reclaimed from the scrap it will insure a finished manganese steel, melting the charge under substantially non-oxidizing conditions, and modifying the melt so that the resultant steel will have a silicon content of 0.50 per cent or more.

14. That improvement in the production of manganese steel in the electric furnace, which consists in introducing into the furnace, before the application of heat to the charge and while providing for substantially non-carbonizing and non-oxidizing conditions, substantially that proportion of ferro-manganese required to produce commercial manganese steel.

In testimony whereof we affix our signatures.

RICHARD D. JORDAN.
JOHN H. HALL.